(12) United States Patent
Huang

(10) Patent No.: US 8,116,892 B2
(45) Date of Patent: Feb. 14, 2012

(54) SOUND EFFECT SENSING TURNTABLE FOR A DIGITAL MUSIC BROADCASTER

(75) Inventor: Jin Yi Huang, Tainan Hsien (TW)

(73) Assignee: Ya Horng Electronic Co., Ltd., Tainan Hsien (TW)

( * ) Notice: Subject to any disclaimer, the term of this patent is extended or adjusted under 35 U.S.C. 154(b) by 839 days.

(21) Appl. No.: 12/219,252

(22) Filed: Jul. 18, 2008

(65) Prior Publication Data

US 2009/0164033 A1    Jun. 25, 2009

(30) Foreign Application Priority Data

Dec. 24, 2007 (TW) ................................ 96221988 U

(51) Int. Cl.
*G11B 17/028* (2006.01)
(52) U.S. Cl. ............................. 700/94; 720/695; 84/603
(58) Field of Classification Search ............... 700/94; 720/695; 84/603
See application file for complete search history.

(56) References Cited

U.S. PATENT DOCUMENTS

| 7,208,672 | B2* | 4/2007 | Camiel | 84/625 |
| 7,401,345 | B2* | 7/2008 | Liu | 720/695 |
| 2007/0050059 | A1* | 3/2007 | Liu | 700/94 |
| 2007/0050060 | A1* | 3/2007 | Liu et al. | 700/94 |
| 2007/0143772 | A1* | 6/2007 | Liu | 720/695 |
| 2009/0164033 | A1* | 6/2009 | Huang | 700/94 |
| 2010/0138643 | A1* | 6/2010 | Huang | 713/2 |
| 2010/0147137 | A1* | 6/2010 | Huang | 84/603 |
| 2010/0149118 | A1* | 6/2010 | Huang | 345/173 |

\* cited by examiner

*Primary Examiner* — Laura Menz
(74) *Attorney, Agent, or Firm* — Bacon & Thomas, PLLC

(57) ABSTRACT

A sound effect sensing turntable for a digital music broadcaster includes a capacitive charge sensing plate able to independently detect the variation of charge. A signal transmission unit is disposed between the sensing plate and a control plate for transmitting signals and thus, on receiving a signal, the control plate will produce relative sound effect to be output. In operating, when a DJ's fingers slightly touch the turntable, the sensing plate will sense charge variation on the turntable and actuate the control plate to control corresponding sound effect. By detecting the variation of charge on the turntable for controlling sound effect, the mode of touching the turntable of this invention for producing sound effect is like that of conventionally controlling a vinyl record for controlling sound effect, getting rid of conventional defect of producing wrong sound effect due to assembly errors.

4 Claims, 7 Drawing Sheets

(A-A)

(B-B)

SOUND EFFECT SENSING TURNTABLE FOR A DIGITAL MUSIC BROADCASTER

BACKGROUND OF THE INVENTION

1. Field of the Invention

This invention relates to a sound effect sensing turntable for a digital music broadcaster, particularly to one able to control the digital music broadcaster to produce different sound effects by detecting and controlling the variation of charge on a turntable.

2. Description of the Prior Art

Generally, a digital music broadcaster digitizes music and stores the music in its interior for facilitating storing, selecting and broadcasting the music. A conventional digital music broadcaster 10 used by a club DJ has its topside provided with a touching turntable 11 for the DJ to produce sound effects and simulate controlling vinyl records, as shown in FIGS. 1, 2 and 3. By pressing the turntable 11 with fingers, the DJ can change and produce different sound effects (like producing portamento) broadcast by the digital music broadcaster 10. Referring to FIGS. 2 and 3, the machine body 12 of the digital music broadcaster 10 is provided in the interior with a shaft rod 13 driven to rotate and having its upper end connected with the turntable 11 for driving the turntable 11 to rotate. The machine body 12 under the turntable 11 is fixed inside with an immovable sensing plate 14 for transmitting signals to the control plate of the digital music broadcaster 10. The turntable 11 is formed with a recessed upper cover fixing disc 110 having a bitmap disc 111 engaged therein, and the bitmap disc 111 has its underside disposed with a plurality of press rods 1110 protruding downward and preset in position, with the lower ends of the bitmap disc 111 close to or slightly contacting with the sensing plate 14. The bitmap disc 111 has its upper side placed thereon with a soft upper cover 112 having its surface formed with concentric-circle streaks.

When expecting to produce sound effect, a conventional DJ presses down the soft upper cover 112 with fingers to push the press rods 1110 of the bitmap disc 111 to move downward and contact with the sensing plate 14 under. After pressed, the sensing plate 14 will transmit a signal to the control plate to control the digital music broadcaster 10 to produce and broadcast relative sound effect. Such conventional mode of controlling sound effect by forcefully pressing the upper cover 112 with fingers to let the lower ends of the press rods 1110 contact with the sensing plate 14 is different from a mode of controlling sound effect by horizontally pushing a vinyl record with the fingers of a conventional DJ. In addition, when assembled, if the members of the conventional turntable 11 produce errors, or they are not assembled at absolutely horizontal positions or assembled closely, it is easy to cause sensing errors and produce wrong sound effect.

SUMMARY OF THE INVENTION

The objective of this invention is to offer a sound effect sensing turntable for a digital music broadcaster, able to control sound effects accurately and simulate operating a vinyl record to produce sound effect by detecting and controlling the variation of charge on a turntable.

The feature of this invention is that the sensing plate is a capacitive charge sensing plate able to independently detect the variation of charge on the turntable. A signal transmission unit is disposed between the sensing plate and a control plate for transmitting signals and thus, on receiving a signal, the control plate will produce relative sound effect to be broadcast. In operating and using, when DJ's fingers slightly touch the turntable, the sensing plate will detect the variation of charge on the turntable and actuate the control plate to control corresponding sound effect. By detecting and controlling the variation of charge on the turntable for producing sound effects, the mode of touching the turntable of this invention for producing sound effect is like that of conventionally operating a vinyl record for controlling sound effect, able to improve conventional drawbacks of producing wrong sound effect because of errors in assembly.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
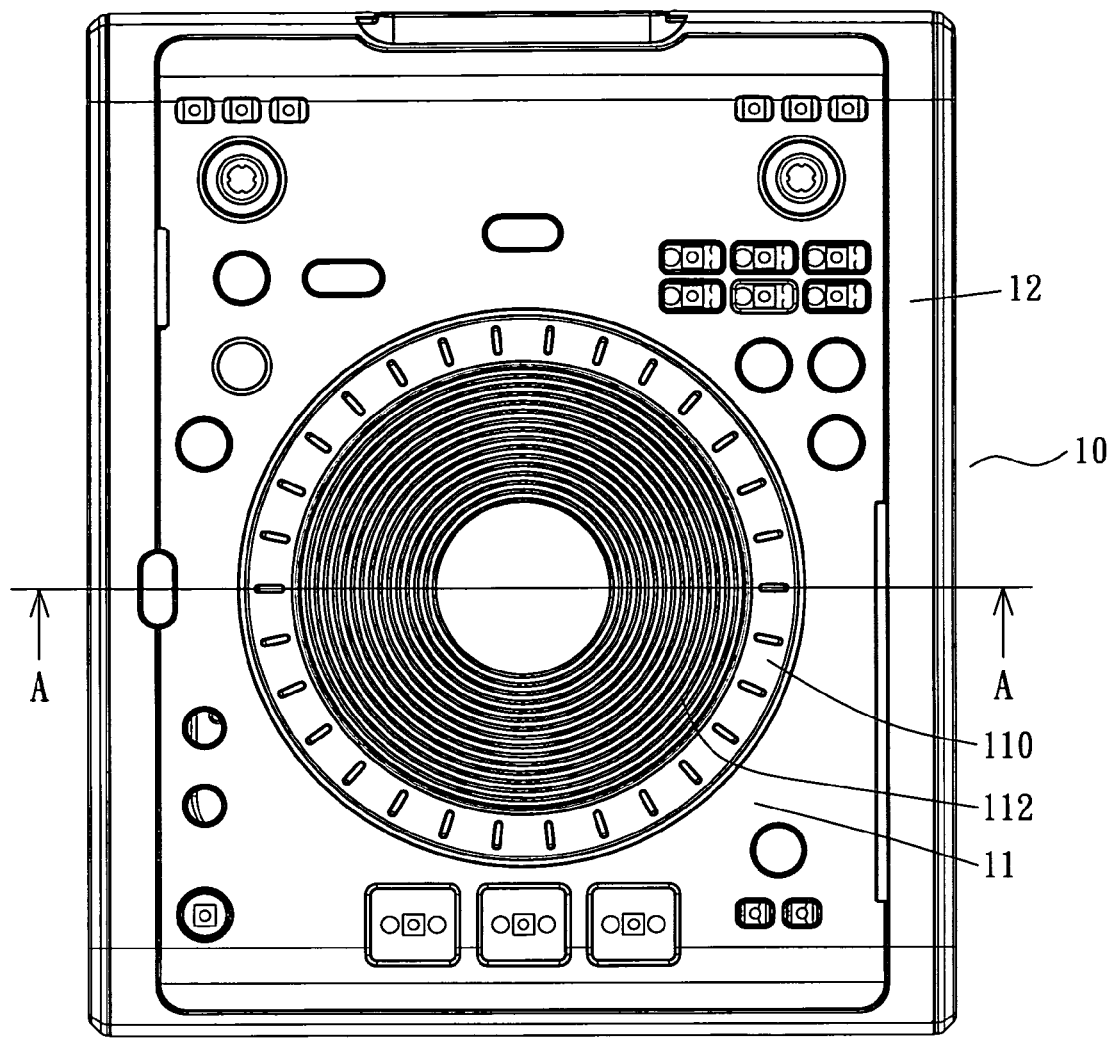
FIG. 1 is an upper view of a conventional digital music broadcaster.
Figure 2:
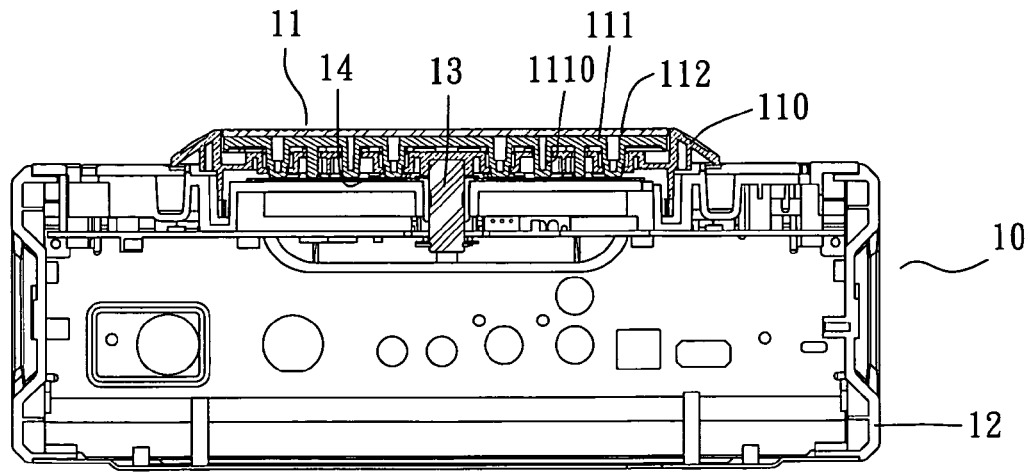
FIG. 2 is a cross-sectional view of the line A-A in FIG. 1.
Figure 3:
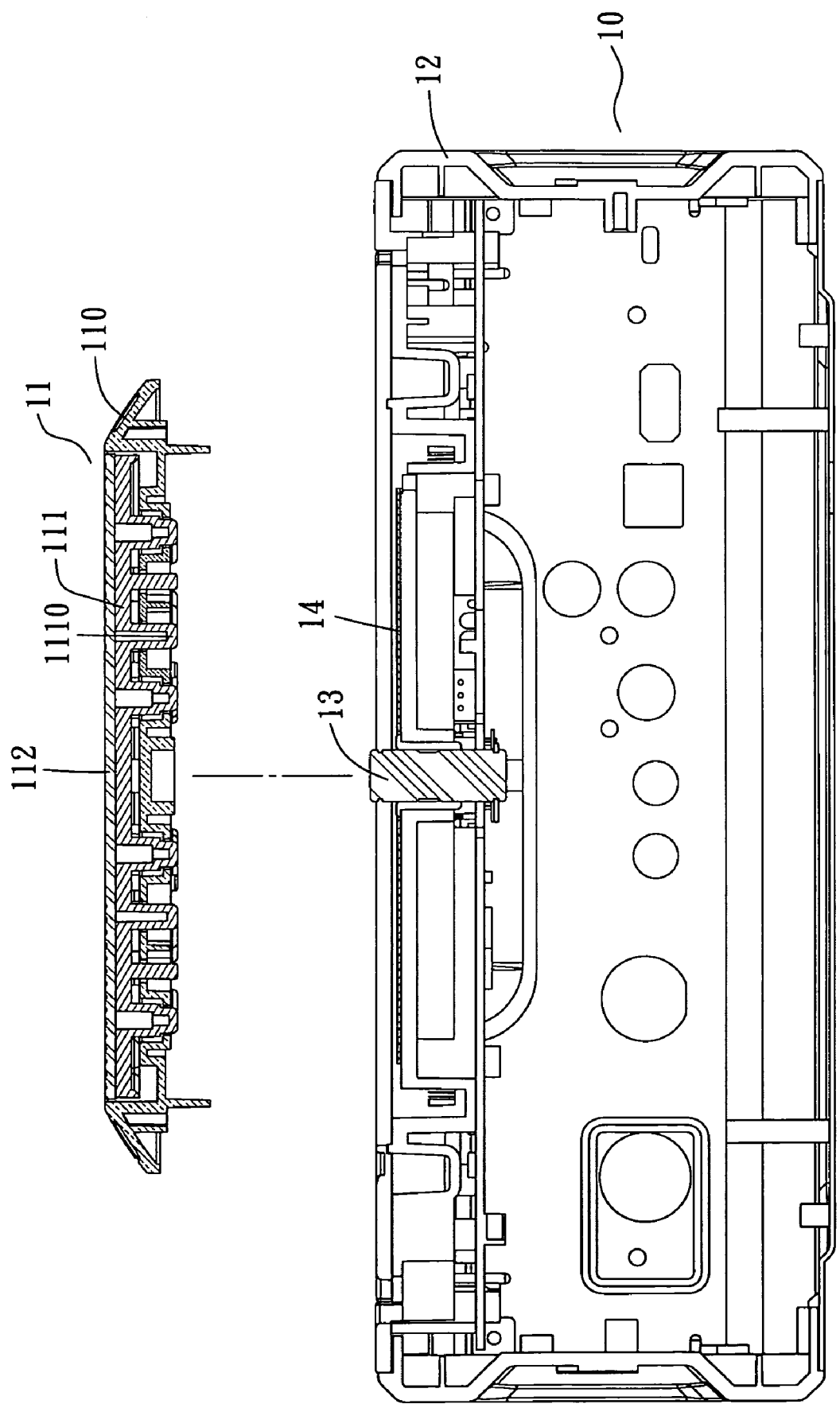
FIG. 3 is a partial exploded cross-sectional view of FIG. 2.
Figure 4:
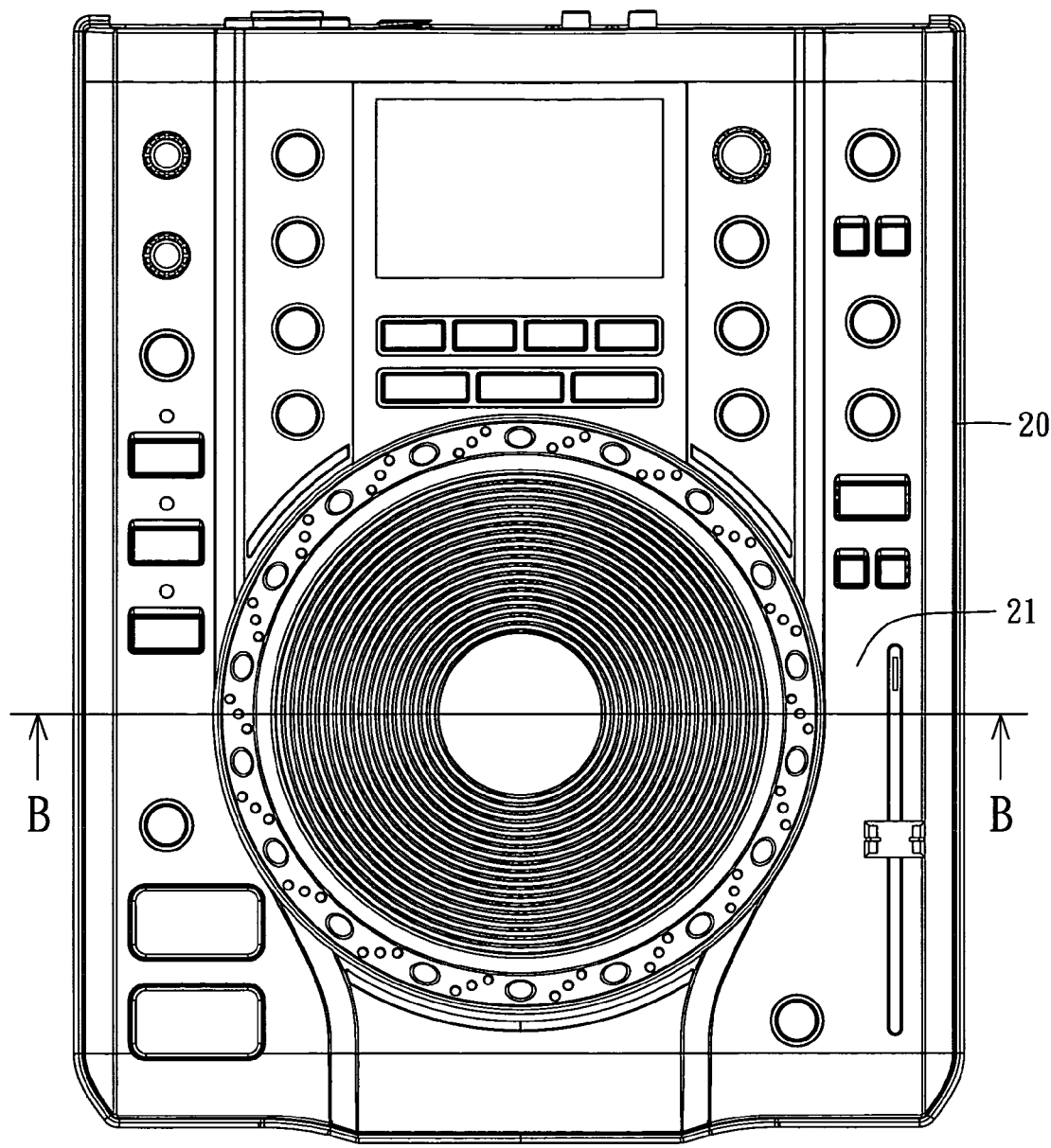
FIG. 4 is an upper view of a first preferred embodiment of a digital music broadcaster in the present invention.
Figure 5:
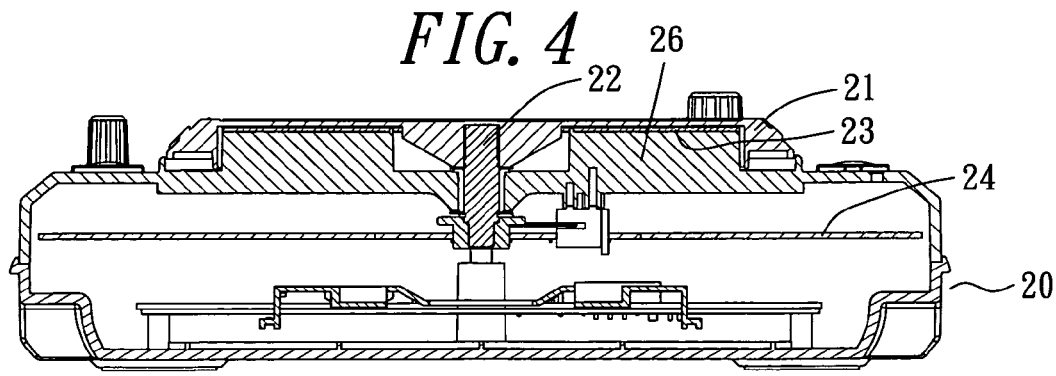
FIG. 5 is a cross-sectional view of the line B-B in FIG. 4.
Figure 6:
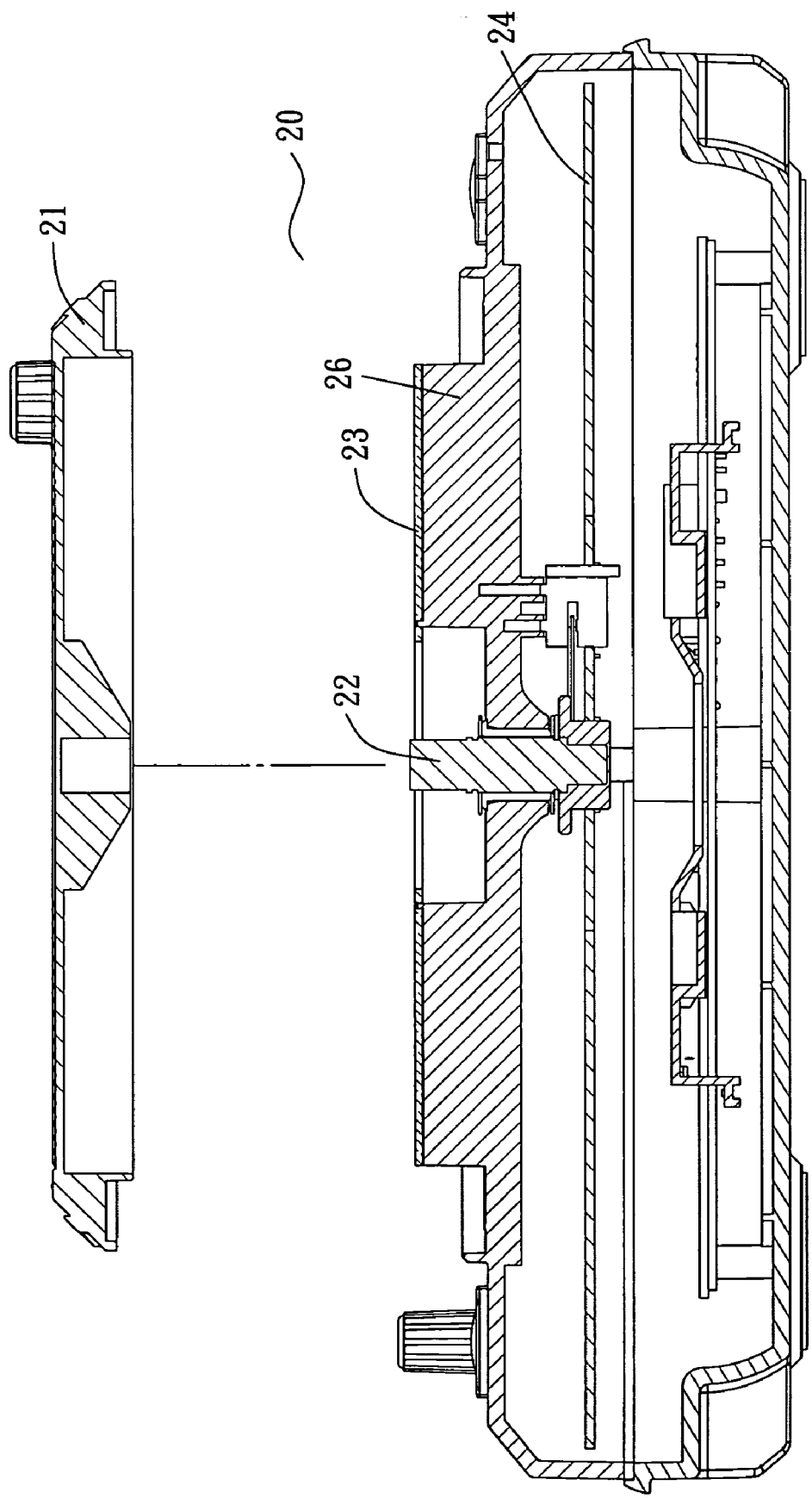
FIG. 6 is a partial exploded cross-sectional view of FIG. 5.

A first preferred embodiment of a digital music broadcaster 20 in the present invention, as shown in FIGS. 4, 5 and 6, includes a touching turntable 21, a shaft rod 22, a sensing plate 23 and a control plate 24 as main components combined together. The touching turntable 21 is supported and actuated to rotate by the shaft rod 22 that is driven to rotate by a motor. The sensing plate 23 is a capacitive charge sensing plate positioned under the turntable 21 for a certain distance and immovably fixed with the machine body of the digital music broadcaster 20, able to independently detect the variation of charge on the turntable 21, and a signal transmission unit is disposed between the sensing plate 23 and the control plate 24 for transmitting and receiving signals. Thus, a signal of charge variation on the turntable 21, detected by sensing plate 23, can be transmitted to the control plate 24 via the signal transmission unit to let the control plate 24 control the digital music broadcaster 20 produce corresponding action to broadcast different sound effects. Since both the sensing plate 23 and the control plate 24 are immovable, the signal transmission unit can serve as a flat cable for transmitting signals.

In operating and using, all a DJ has to do is to slightly touch the turntable 21 with fingers to let the sensing plate 23 under the turntable 21 immediately detect the variation of charge on the turntable 21. Simultaneously, the sensing plate 23 will transmit a signal of charge variation to the control plate 24 through the signal transmission unit (the flat cable) to let the control plate 24 produce corresponding sound effect to be output.

Figure 7:
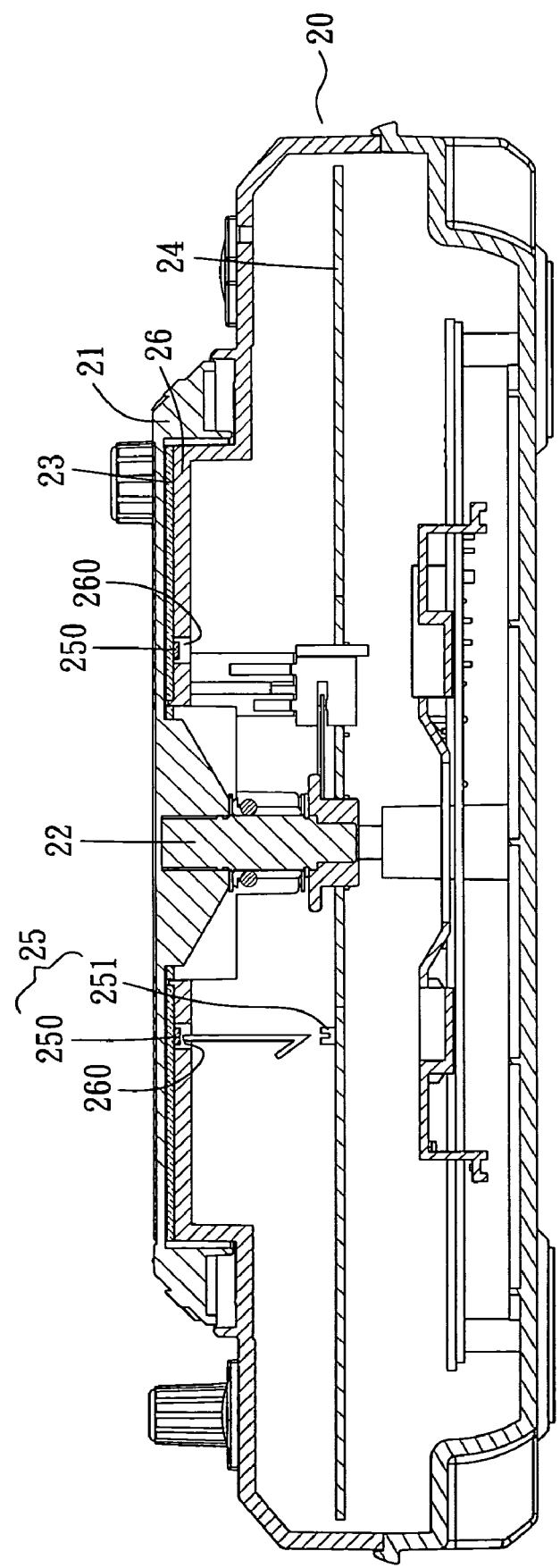
FIG. 7 is a cross-sectional view of a second preferred embodiment of a digital music broadcaster in the present invention.
Figure 8:
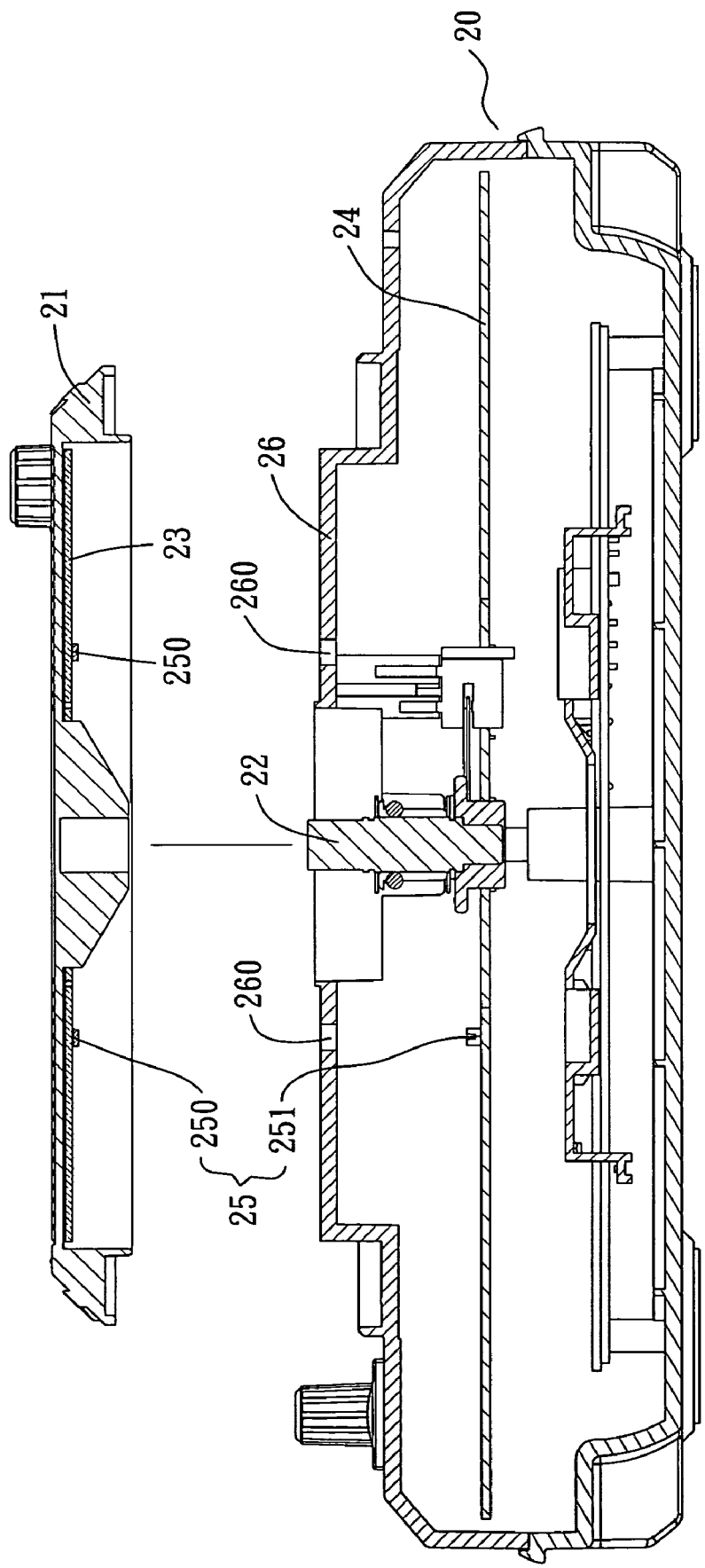
FIG. 8 is a partial exploded cross-sectional view of FIG. 7.

A second preferred embodiment of a digital music broadcaster in the present invention, as shown in FIGS. 7 and 8, is to have the turntable 21 and the capacitive charge sensing plate 23 firmly combined together to be actuated to rotate by the shaft rod 22 that is driven by a motor. A signal transmission unit 25 is installed between the sensing plate 23 and a control plate 24 for transmitting signals and provided with a plurality of luminous elements 250 (such as LED), which are secured under the sensing plate 23 and arranged annularly and equidistantly. The machine body 26 is formed with an annular groove 260 at a location corresponding with the luminous elements 250 of the sensing plate 23 so that light emitted by the luminous elements 250 can be projected downward through the groove 260. A light-sensing member 251 is fixed on the control plate 24 at a location facing the luminous elements 250 for sensing the bright light of the luminous bodies 250. When a DJ's fingers touch the turntable 21, the sensing plate 23 will detect a signal of charge variation on the turntable 21 and transmit the signal to the control plate 24 through the luminous elements 250 and the light sensing member 251 to let the control plate 24 produce relative sound effect to be output.

Figure 9:
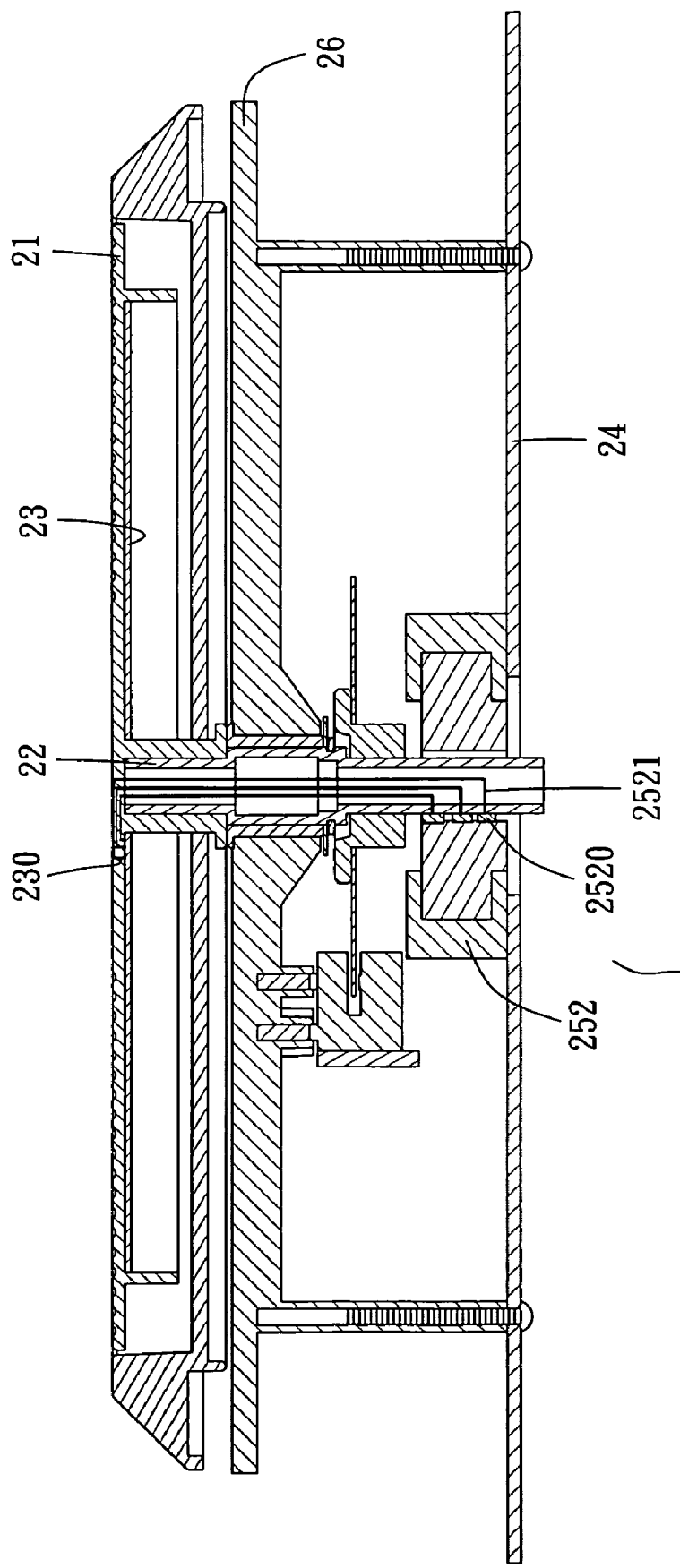
FIG. 9 is a partial cross-sectional view of a third preferred embodiment of a digital music broadcaster in the present invention.

A third preferred embodiment of a digital music broadcaster in the present invention, as shown in FIG. 9, is to have the turntable 21 and the capacitive charge sensing plate 23 firmly fixed together to be actuated to rotate by the shaft rod 22 that is driven to rotate by a motor. The control plate 24 is secured with the machine body 26, and the digital transmission unit 25 is positioned between the sensing plate 23 and the control plate 24 for transmitting signals. The signal transmission unit 25 is fixed with a rotary connecting base 252 located at the center of the control plate 24 and having one end formed with a rotatable signal input terminal 2520 with various signal contacts respectively connected with the signal output terminals 230 of the capacitive charge sensing plate 23 by means of signal connecting wires 2521. The signal output terminals 230 of the capacitive charge sensing plate 23 are disposed concentrically but positioned within unequal radius to prevent the signal connecting wires 2521 from getting entangled with one another when the capacitive charge sensing plate 23 is rotated together with the turntable 21. Thus, signals sensed by the capacitive charge sensing plate 23 can equally be transmitted to the control plate 24 by means of the signal connecting wires 2521 and the rotary connecting base 252 of the signal transmission unit 25.

As can be understood from the above description, the sensing plate 23 and the turntable 21 in the first preferred embodiment of this invention are separated while the sensing plate 23 and the control plate 24 are immovable; therefore, when the sensing plate 23 detects a signal of charge variation on the turntable 21, the signal can be transmitted to the control plate 24 by means of the flat cable, which serves as a signal transmission unit. In the second preferred embodiment of this invention, the sensing plate 23 and the turntable 21 are fixedly combined for rotating together; therefore, signal transmission between the sensing plate 23 and the immovable control plate 24 needs to rely upon both the luminous elements 251 that is rotated together with the sensing plate 23 and the light sensing member 251 that is secured on the control plate 24. In the third preferred embodiment of this invention, the sensing plate 23 and the turntable 21 are also firmly combined for rotating together; therefore, signal transmission between the sensing plate 23 and the immovable control plate 24 has to depend on both the signal connecting wires 2521 that are rotated together with the sensing plate 23 and the rotary connecting base 252 that is secured on the control plate 24 but its signal input terminals 2520 can be movably rotated.

By so designing, so long as a DJ's fingers touch the turntable 21, the sensing plate 23 will be able to detect the variation of charge on the turntable 21 and then transmit a signal to the control plate 24, unnecessary to have fingers pressed on the turntable with force for transmitting signals as a conventional DJ does. To sum up, the digital music broadcaster of this invention is much more accurate than the conventional one in controlling and producing sound effect, and the operation mode of touching the turntable of this invention comparatively tallies with an operation mode that a conventional DJ touches a vinyl record for producing sound effect, having effect of simulating touching vinyl records.

While the preferred embodiments of the invention have been described above, it will be recognized and understood that various modifications may be made therein and the appended claims are intended to cover all such modifications that may fall within the spirit and scope of the invention.

I claim:

1. A sound effect sensing turntable for a digital music broadcaster comprising:
a turntable driven to rotate, said turntable having its underside provided with a sensing plate for sensing a motion signal produced when a person operates said turntable, said sensing plate transmitting said motion signal to a control plate through a signal transmission unit for controlling sound effect;
wherein said sensing plate is a capacitive charge sensing plate able to detect variation of charge on said turntable, said sensing plate detecting a signal of charge variation so long as a person's fingers touch said turntable, said sensing plate transmitting said signal to said control plate via said signal transmission unit.

2. The sound effect sensing turntable for a digital music broadcaster as claimed in claim 1, wherein said sensing plate and said turntable are separated for a certain distance, while both said sensing plate and said control plate are immovable, a flat cable disposed between said sensing plate and said control plate to serve as said signal transmission unit for transmitting signals.

3. The sound effect sensing turntable for a digital music broadcaster as claimed in claim 1, wherein said sensing plate and said turntable are firmly combined for rotating together, and said signal transmission unit is positioned under said sensing plate and provided with plural luminous elements arranged annularly and equidistantly, said control plate having its topside disposed with a light sensing member at a location facing said luminous elements for sensing light of said luminous elements, signals between said sensing plate and said control plate transmitted by said luminous elements and said light sensing member.

4. The sound effect sensing turntable for a digital music broadcaster as claimed in claim 1, wherein said sensing plate and said turntable are fixedly combined for rotating together, and said signal transmission unit is fixed with a rotary connecting base at a center of said control plate, said rotary connecting base having one end disposed with a rotatable signal input terminal with various signal contacts, said signal contacts respectively connected with signal output terminals of said capacitive charge sensing plate by means of signal connecting wires, said signal output terminals of capacitive charge sensing plate disposed concentrically but positioned within unequal radius.

* * * * *